(12) United States Patent
Sharifi Mehr

(10) Patent No.: US 10,073,980 B1
(45) Date of Patent: *Sep. 11, 2018

(54) SYSTEM FOR ASSURING SECURITY OF SENSITIVE DATA ON A HOST

(71) Applicant: AMAZON TECHNOLOGIES, INC., Seattle, WA (US)

(72) Inventor: Nima Sharifi Mehr, Vancouver (CA)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/862,371

(22) Filed: Jan. 4, 2018

Related U.S. Application Data

(63) Continuation of application No. 14/837,952, filed on Aug. 27, 2015, now Pat. No. 9,910,994.

(51) Int. Cl.
*G06F 17/30* (2006.01)
*G06F 21/60* (2013.01)
*G06F 17/27* (2006.01)

(52) U.S. Cl.
CPC ........ *G06F 21/604* (2013.01); *G06F 17/2705* (2013.01); *G06F 17/30598* (2013.01); *G06F 17/30864* (2013.01)

(58) Field of Classification Search
None
See application file for complete search history.

(56) References Cited

U.S. PATENT DOCUMENTS

| | | | | |
|---|---|---|---|---|
| 8,321,204 | B2* | 11/2012 | Kalyan | G06F 17/30702 704/10 |
| 9,304,995 | B2* | 4/2016 | Gupta | G06F 17/30067 |
| 9,317,592 | B1* | 4/2016 | Bowman | G06F 17/30705 |
| 9,760,548 | B2* | 9/2017 | Cooke | G06F 17/2211 |
| 2002/0138470 | A1* | 9/2002 | Zhou | G06F 17/30949 |
| 2007/0220061 | A1* | 9/2007 | Tirosh | G06F 21/556 |
| 2009/0109479 | A1* | 4/2009 | Kato | G06F 17/243 358/1.15 |
| 2013/0227714 | A1* | 8/2013 | Gula | G06F 21/64 726/32 |
| 2015/0033120 | A1* | 1/2015 | Cooke | G06F 17/2211 715/271 |
| 2016/0277368 | A1* | 9/2016 | Narayanaswamy | G06F 21/6218 |
| 2017/0026350 | A1* | 1/2017 | Dawoud | H04L 63/0471 |
| 2017/0063883 | A1* | 3/2017 | Franzoni Martinez | H04L 63/1416 |
| 2017/0075986 | A1* | 3/2017 | Morimoto | G06F 17/30598 |
| 2017/0251001 | A1* | 8/2017 | Franzoni Martinez | H04L 63/1416 |

OTHER PUBLICATIONS

McCoy, Richard A., "Notice of Allowance dated Oct. 27, 2017", U.S. Appl. No. 14/837,952, The United States Patent and Trademark Office, dated Oct. 27, 2017.

* cited by examiner

*Primary Examiner* — Morshed Mehedi
*Assistant Examiner* — Richard A McCoy
(74) *Attorney, Agent, or Firm* — Lindauer Law, PLLC

(57) ABSTRACT

Techniques determine and mitigate leakage of sensitive data into log data. The message is parsed to identify a first value and a first data classification tag indicative of sensitive data and that refers to the first value. Log data is accessed to determine whether the first value is present in the log data. One or more actions are performed based on the first value being present in the log data.

20 Claims, 8 Drawing Sheets

SYSTEM FOR ASSURING SECURITY OF SENSITIVE DATA ON A HOST

PRIORITY

This application claims priority to U.S. patent application Ser. No. 14/837,952 filed on Aug. 27, 2015, entitled "System For Assuring Security Of Sensitive Data On A Host." The entirety of this previously filed application is hereby incorporated by reference.

BACKGROUND

Servers providing services to clients may generate log data. Leakage of sensitive data from the service into the log data may increase the risk that the sensitive data or the service may be compromised.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
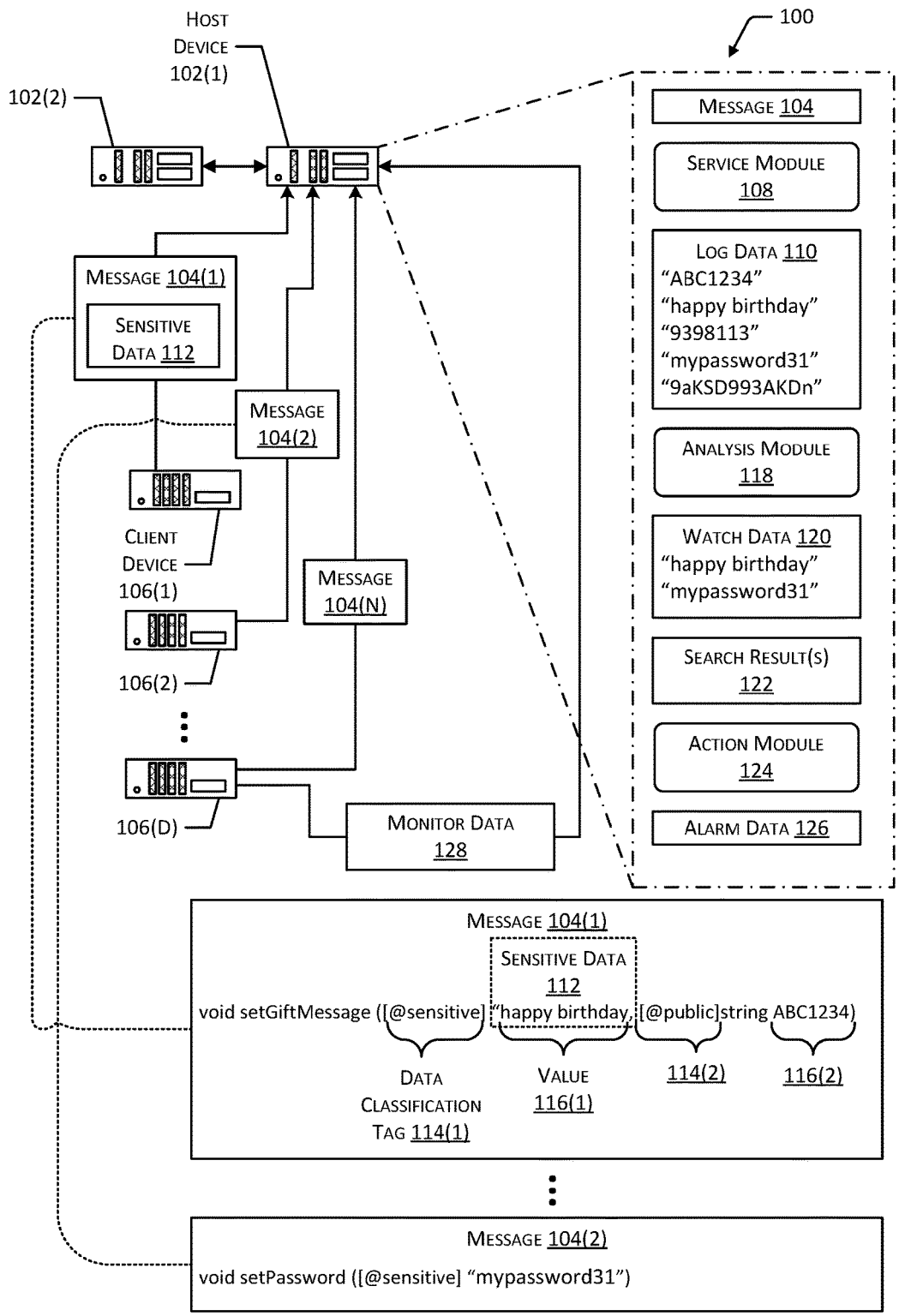
FIG. 1 depicts a system for determining leakage of sensitive data into log data, according to one implementation.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Host devices, such as servers, dedicated devices, and so forth, may execute services that process messages from other devices or processes executing on the same host. The messages may include, but are not limited to, requests, responses to requests, and so forth. To assist in one or more of administrative, maintenance, operational, planning, or other purposes, log data may be acquired that provides details about operation of the service processing the message. Sometimes messages may include sensitive data. Sensitive data may include, but is not limited to, personally identifiable information, cryptographic data, messages from one user to another, access credential data, and so forth.

A best practice when processing sensitive data is to tightly control where the sensitive data is stored. Ideally, sensitive data is processed and stored in a secure environment. The secured environment may include storage that may be provided with special security controls, dedicated hardware, and so forth. Log data is typically designated as being non-sensitive or "public" data. The "public" data may be public in the sense that it is not deemed to be sensitive data but is not typically provided to a process, person, or entity outside of those associated with the host and the service.

Typically, security on log data is minimal for many reasons. These reasons may include minimizing delays in operation of the service due to logging operations, to reduce costs and complexity associated with securing the log data, programmer skill, and so forth. Inadvertent transfer or "leaking" of sensitive data into log data may occur. This leakage negates or otherwise compromises the advantages of the secured environment and may leave the leaked sensitive data vulnerable to misuse.

Traditional systems for identifying sensitive data in log data may be complex to maintain and prone to false alarms. This is particularly complicated when the sensitive data does not exhibit a well formed structure. For example, gift messages, credentials, physical addresses, application specific tokens, and so forth may have variable lengths, formats, and so forth. In comparison, sensitive data with a well formed structure, such as a 16 digit credit card number, may be determined relatively easily when processed with the Luhn algorithm. As systems and the services they provide continue to scale up and the number of messages processed increase, existing systems may not be able to provide useful information to system administrators or other interested parties. As a result, leakage of sensitive data into log data may occur.

Described in this disclosure are techniques and systems for providing various functionality with regard to situations involving log data and the processing of sensitive data. A first technique employs data classification tags that may be included in a message to or from a service. Data fields ("fields") associated with sensitive data may be designated as such using the data classification tags. Non-sensitive or "public" data in the message may be left untagged, or may be tagged using a data classification tag indicative of the "public" status. Other tags may indicate other statuses as well.

The service may receive many messages that originate from one or more different client devices. The client devices may be configured to include the data classification tags in the messages. The host device may sample the incoming messages. For example, a random sample may be used of those messages that have been received. The sampled messages may be analyzed to determine the presence of the data classification tags indicative of sensitive data. Values associated with the data classification tags indicative of sensitive data may be stored as or added to watch data. In some implementations, the watch data may be stored in a secure environment, may be encrypted, hashed, and so forth.

The log data may be searched to determine if one or more of the values stored in the watch data are present. A count may be determined of the number of occurrences of the value from the watch data that appear in the log data. If this count exceeds a threshold value, one or more actions may be performed. For example, the action may include generating an alarm, deactivating the service, tightening the security controls associated with execution of the service, and so forth.

A second technique accesses monitor data that is indicative of a particular message sent to the service for processing. The monitor data includes predetermined data. For example, the monitor data may include values of sensitive or public fields. The monitor data may also include information indicative of context data for the message. For example, the context data may include one or more of an application session identifier, source network address, a communication session identifier, timestamp, a process identifier, and so forth. The host device that receives the message may have access to the monitor data. For example, the client device may send the host device the monitor data after a message has been sent.

With this second technique, the host device searches the log data for information that is contained in the monitor data. During normal operation of the host device, the log data should contain one or more pieces of information that appear in the log data. By searching the log data of the host device for this information, the host device may determine if the logging functionality is operating normally. For example, if the monitor data appears in the log data, then the logging functionally appears operational. In comparison, if the monitor data does not appear in the log data within a threshold amount of time, a failure on the host device may be determined.

Modules implementing the first technique, second technique, or both in combination may be executed on the client device, host device, or both. In some implementations, client devices may act as host devices for their own respective services, and vice versa.

Host devices may intercommunicate with one another to exchange information. This exchange of information may improve the detection or determination of larger scale failures or attacks. In one implementation, the watch data, or information based thereon such as hashes of the values therein, may be exchanged between host devices or sent to a centralized server. A determination that the same value in the watch data appears across multiple hosts may be indicative of a systemic issue. For example, a code insertion attack on a fleet of host devices may be determined by seeing the same value of sensitive data appearing in the watch data from many hosts.

By using the techniques described herein, leakage of sensitive data into log data may be determined. As a result, security of the sensitive data and operation of the system overall may be improved by actually using subsystems that may be less secure. For example, log data may be stored in less expensive or less complicated unsecure storage, while still maintaining the ability to determine if sensitive data has been improperly stored in the unsecure storage. This improves operation by improving the speed and reducing the cost of operation of a particular host device by reducing the computational overhead associated with maintaining the log data in a secure environment. System operation is also improved by allowing for generation of detailed log data while mitigating concerns about leakage of that information to undesired parties. Additionally, operation of the logging system may be tested and verified, or a fault determined using monitor data. The system may operate in a distributed fashion, with individual hosts intercommunicating with one another, may utilize a centralized server, or may employ a combination of distributed and centralized topography.

Illustrative Systems

FIG. 1 depicts a system 100 for determining leakage of sensitive data into log data, according to one implementation. A host device 102 receives one or more messages 104 from one or more client devices 106. The host device 102 and the client device 106 are each a computing device.

The message 104 is processed by a service module 108 of the host device 102. The service module 108 may be configured to utilize information in or associated with the message 104 to perform one or more actions on the host device 102. In some implementations, the service module 108 may call or utilize the services of one or more other service modules 108 by generating additional messages 104 and passing along the original message 104 to the one or more other service modules 108. For example, the message 104 may originate on the same computing device and be sent from one service module 108(1) to another service module 108(2). In some situations, a service module 108 may generate a response (not shown) that may be returned to the client device 106. For example, the message 104 may comprise a query to a database, and the response may include the information selected by the query.

During operation, the service module 108 may generate log data 110. The log data may comprise information that is of use for one or more of administrative, maintenance, operational, planning, or other purposes. The log data 110 may be stored locally on the host device 102, or may be provided to another computing device. In some implementations, a digest of the log data 110 may be provided to another computing device.

Sometimes messages 104 may include sensitive data 112. Sensitive data 112 may include, but is not limited to, personally identifiable information, cryptographic data, messages from one user to another, access credential data, and so forth. For example, access credential data may include tokens or other information that is used in an authentication process. In some situations, sensitive data 112 may be deemed sensitive in a particular context or under certain circumstances and not in others. Data may be deemed to be sensitive as a result of regulatory, administrative, operational, or other considerations.

A best practice when processing sensitive data 112 is to tightly control where the sensitive data 112 is stored. Ideally, sensitive data 112 is processed and stored in a secure environment. The secured environment may include storage on or accessible to the host device 102 that may be provided with special security controls, dedicated hardware, and so forth. For example, the sensitive data 112 may be processed within a trusted computing environment that utilizes memory curtaining to restrict access to the data stored therein.

Log data 110 is typically designated as being non-sensitive or "public" data. The "public" data may be public in the sense that it is not deemed to be sensitive data 112 but is not typically provided to a process, person, or entity outside of those associated with the host and the service. For example, public data may include an order number, shipping weight, distribution center identifier, and so forth. Public data may be subject to fewer limitations or having fewer security safeguards applied as compared to sensitive data 112. For example, public data may unencrypted, encrypted using relatively shorter keys as compared to sensitive data 112, and so forth.

Typically, security on log data 110 is minimal for many reasons. These reasons may include minimizing delays in operation of the service due to logging operations, to reduce costs and complexity associated with securing the log data 110, programmer skill, and so forth. Inadvertent transfer or "leaking" of sensitive data 112 into log data 110 may occur. This leakage negates or otherwise compromises the advantages of the secured environment and may leave the leaked sensitive data 112 vulnerable to misuse.

The determination of what values in the message 104 are sensitive data 112 is a complex one, particularly when the sensitive data 112 does not exhibit a well formed structure. For example, sensitive data 112 that does not exhibit a well formed structure may include communication between users in a social networking environment, gift messages, communications between users and a gaming system or other users, credentials, physical addresses for shipping or billing customers, application specific tokens, and so forth, that have variable lengths or formats. This variability makes these values challenging to search for and identify in the log data 110.

To facilitate the identification of sensitive data 112 within the message 104, one or more data classification tags 114 may be used. The data classification tags 114 may be used to designate a type of data of a particular value 116 in the message 104. For example, the data classification tags 114 may be set to designate that an associated value 116 is either sensitive or public. In other implementations, other types of data may be specified. For example, the data classification tags 114 may be used to indicate that the value 116 contains a low, medium, or high level of sensitivity.

In one implementation, the data classification tags 114 may be designated in an API or an API call. For example, a developer may insert the data classification tags 114 during programming. In another implementation the data classification tags 114 may be generated automatically. For example, the module that is generating the message 104 may insert a data classification tag 114 based on particular inputs to the module, such as received from a cryptographic module.

In another implementation, the message 104 may be analyzed to determine a metric indicative of whether the message 104 includes sensitive data 112. The machine learning system may learn the difference between sensitive data 112 and public data. The machine learning system may be trained using inputs to particular modules, their outputs, previously designed data classification tags 114, the values 116 themselves, and so forth. For example, a machine learning system may be trained using previously specified data classification tags 114 and their associated values 116.

A particular message 104 may include a plurality of data classification tags 114 with corresponding values 116. For example, the message 104(1) includes a first data classification tag 114(1) of "@sensitive" that is indicative of sensitive data 112 with a corresponding value 116(1), as well as the second data classification tag 114(2) of "@public" with a corresponding value 116(2). Continuing the example depicted in FIG. 1, the message 104(1) includes sensitive data 112 of "happy birthday" and public data of "ABC1234". Similarly, message 104(2) includes a data classification tag 114 indicative of sensitive data 112 with a value 116 of "mypassword31".

The host device 102 may include an analysis module 118. The analysis module 118 is configured to process at least a portion of the messages 104 received by the service module 108. In some implementations, the analysis module 118 may be executed on another computing device. The analysis module 118 may use one or more techniques to select a particular message 104 for analysis. For example, output from a pseudorandom number generator, a sequence number associated with each message 104, a user identifier associated with an origin of the message 104, a service identifier associated with the origin of the message 104, a network address indicative of the origin of the message 104, a timestamp of the message 104, an application programming interface (API) method identifier, and so forth, may be used to select a message 104 for analysis. For example, the API method identifier may be used to select a variety of different messages 104 that involve different API methods.

The message 104 is processed to determine the presence of sensitive data 112. For example, the service module 108 may utilize an API that accepts and is able to process the data classification tags 114 as well as the values 116 in the message 104. The service module 108, the analysis module 118, or both may detect the data classification tag 114 and store the value 116 associated with the data classification tag 114 as watch data 120. In some implementations, the watch data 120 may be stored in a secure environment. The secure environment may employ access control mechanisms, physical barriers, cryptography, and so forth. The secure environment is designed to ensure that only those entities that are authorized to access the data may actually access it. In some implementations, the secure environment may utilize a trusted computing platform, dedicated cryptographic hardware, may encrypt stored data, and so forth. For example, the secure environment may include servers that have access to a network limited by one or more firewalls. The watch data 120 may include one or more of a user identifier associated with making the message 104, a service identifier associated with making the message 104, a timestamp associated with the message 104, a network address indicative of an origin of the message 104, an API method that was called, an identifier of a message parameter for the API method that was called, and so forth.

The analysis module 118 may access the watch data 120 and the log data 110. The analysis module 118 may use the values 116 stored in the watch data 120 to search the log data 110 and generate search results 122. The search results 122 may be indicative of a match between the values 116 of the watch data 120 and the log data 110. A match may be determined when the two values are identical, or within a threshold variance of one another. For example, in some implementations, a fuzzy logic match may be used to determine two values that are similar but are not identical.

The analysis module 118 may be configured to remove some entries from the watch data 120 under certain conditions. For example, the analysis module 118 may determine that a predetermined amount of time has passed since the addition of the value 116 to the watch data 120. Based on this determination, the analysis module 118 may remove the value 116 that has expired from the watch data 120.

Based at least in part on the search results 122, an action module 124 may perform one or more actions. For example, search results 122 that are indicative of a value of watch data 120 appearing within the log data 110 may result in an action such as generation of alarm data 126. The alarm data 126 may indicate that sensitive data 112 has leaked in the log data 110. The action may comprise providing alarm data 126 to a system administrator, the service module 108, another service module 108, and so forth.

In one implementation, responsive to the alarm data 126, the action module 124 may increase a level of security associated with execution of the service module 108. For example, the increase in the level of security may correspond to one or more of: a reduction in a maximum number of read operations to memory permitted to the service module 108, a reduction in a maximum number of write operations to memory permitted to the service module 108, a limit of communication by the service module 108 to a set of predefined service modules 108, a restriction on access to one or more of an input device or an output device, and so forth. Other actions may involve the log data 110. These actions may include one or more of encrypting the log data 110, making a change in collection of the log data 110, disabling collection of the log data 110, and so forth. For example, the collection of data for storage in the log data 110 may be changed, such as from a verbose logging that includes the sensitive data 112 to a terse logging that may include only a session identifier and a timestamp.

The log data 110 may be encrypted using symmetric keys, public/private key pairs, and so forth. For example, with symmetric key encryption the same key value may be known to the host device 102 or a service module 108 thereon, and another device or service module 108 that is assessing the log data 110. In another example, public keys may be distributed to hosts which then encrypt the log data 110 using the public key. Another service module 108 may use the corresponding private key to decrypt the log data 110 when such access is called for.

Digital certificates may be used to authenticate the host devices 102 or service modules 108 thereon. For example, the host device 102 may provide a digital certificate as to authenticity of the log data 110 to an administrative server that is retrieving the log data 110.

Executable elements may be modified as part of the actions. In one implementation, scripts, executable code, objects, modules, serialization parameters, and so forth, may be changed to mitigate leakage of sensitive data 112 into the log data 110. For example, the action may disable a line of code or portion thereof that is responsible for writing the sensitive data 112 to the log data 110. Once disabled, the leakage of the sensitive data 112 ceases. The modification may include changing a serialization used to write data to the log data 110. In one implementation, serialization is the process of converting a data structure or object state into a stream of bytes for transmission, storage, and so forth. For example, a serialization that writes fewer fields of data to the log data 110 may be selected and replace a default serialization that is causing the leakage of sensitive data 112 to the log data 110. The modifications to the executable elements allow the system 100 to quickly mitigate leakage. In some implementations, a notification of the modification may be provided to a developer, system administrator, or other responsible party.

In another implementation, responsive to the alarm data 126, the action module may decrease a trust level associated with execution of the service module 108. For example, the service module 108 may be deemed to be no longer compliant with the trust computing environment provided by the host device 102.

The analysis module 118 may also be configured to determine if the logging provided by the service module 108 or another service is operating as expected. The host device 102 may access monitor data 128 provided by a client device 106. The monitor data 128 comprises information indicative of one or more predetermined data for a particular message 104. The monitor data 128 may include information in the body of the message 104 such as data classification tags 114 and associated values 116. The monitor data 128 may also include context data associated with a message 104. For example, the context data may include one or more of an application session identifier, source network address, a communication session identifier, timestamp, a process identifier, and so forth. The host device 102 that receives the message 104 may have access to the monitor data 128. For example, the client device 106 may send the host device 102 the monitor data 128 after a message 104 has been sent.

The analysis module 118 may use the monitor data 128 to search the log data 110 and generate search results 122. The search results 122 may indicate if the message 104 was acted upon by one or more of the service modules 108 executing on the host device 102. For example, the monitor data 128 may include information such as a particular network source address, timestamp, or other information that alone or in combination uniquely identifies a particular message 104. Continuing the example, the combination of the network source address, timestamp, and a process identifier may uniquely identify a particular message 104 from thousands of other messages 104 received by the host device 102. The monitor data 128 may comprise only public data, or may in some implementations include sensitive data 112 as well.

The analysis module 118 may provide the search results 122 to the action module 124. The action module 124 may then, based at least in part on the search results 122, take one or more actions. Continuing the example, where the search results 122 indicate that the message 104 specified by the monitor data 128 appears in the log data 110, the action module 124 may generate data indicative of normal operation of the host device 102 or portion thereof. In another example, where the search results 122 indicate that the message 104 specified by the monitor data 128 is not present in the log data 110, the action module 124 may generate alarm data 126 indicative of a failure of at least a portion of the host device 102 or the service modules 108 executing thereon.

The particular message 104 and associated monitor data 128 may comprise an actual message 104 such as generated during the normal operation of the client device 106, or may be specially formed with the express intention of testing. For example, where the client device 106 comprises a load balancer receiving messages 104 from a web browser controlled by a user, the message 104 and the associated monitor data 128 may be from that session with the user. In another example, the client device 106 may be instructed to generate a message 104 having particular monitor data 128. In yet another example, client device 106 may be instructed to relay a message 104 associated with particular monitor data 128 that was generated by another computing device. By using the specially formed message 104, the processing and subsequent logging of events occurring on the host device 102 may be tested.

By using the techniques and systems described above, operation of the host device 102, client device 106, and the interactions between the two may be improved. The system 100 provides ongoing monitoring, assurance, and discovery of potential faults that may result in the inadvertent exposure of sensitive data 112, potential or actual failures, intrusions, and so forth. Once determined, mitigating actions may be taken to secure the sensitive data 112, prevent damage the system 100, and so forth.

Figure 2:
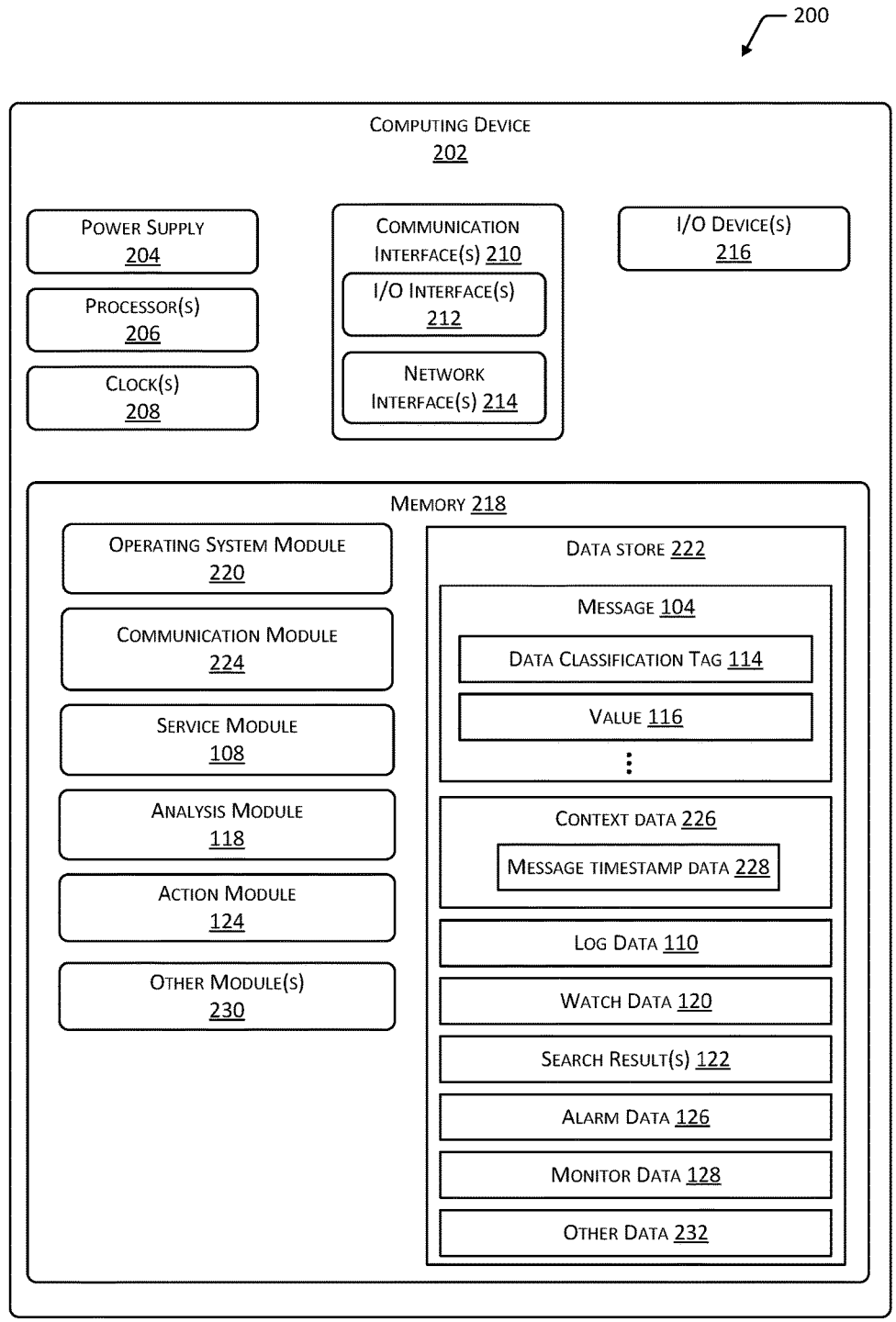
FIG. 2 is a block diagram of a computing device within the scope of the present disclosure, according to one implementation.

FIG. 2 is a block diagram 200 illustrating a computing device 202 within the scope of the present disclosure. The computing device 202 may include one or more host devices 102, client devices 106, end user devices, or other devices in communication therewith. As described previously, one or more of the functions discussed with regard to the host device 102 may be performed by the client device 106. Similarly, one or more of the functions discussed with regard to the client device 106 may be performed by one or more host devices 102. Any type of computing device 202 and any number of networked computing devices may perform the implementations described herein.

One or more power supplies 204 may be configured to provide electrical power suitable for operating the components of the computing device 202. In some implementations, the power supply 204 may include a rechargeable battery, fuel cell, photovoltaic cell, power conditioning circuitry, and so forth.

The computing device 202 may include one or more hardware processor(s) 206 (processors) configured to execute one or more stored instructions. The processor(s) 206 may include one or more cores. One or more clocks 208 may provide information indicative of date, time, ticks, and so forth. For example, the processor(s) 206 may use data from the clock 208 to generate a timestamp, trigger a preprogrammed action, determine the time at which a message 104 is received, and so forth.

The computing device 202 may include one or more communication interfaces 210, such as input/output (I/O) interfaces 212, network interfaces 214, and so forth. The communication interfaces 210 may enable the computing device 202, or components of the computing device 202, to communicate with other computing devices 202 or components of the other computing devices 202. The I/O interfaces 212 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 212 may couple to one or more I/O devices 216. The I/O devices 216 may include any manner of input device or output device associated with the computing device 202. For example, I/O devices 216 may include touch sensors, keyboards, mouse devices, microphones, image sensors (e.g., cameras), scanners, displays, speakers, haptic devices, printers, and so forth. In some implementations, the I/O devices 216 may be physically incorporated with the computing device 202 or may be externally placed.

The network interfaces 214 may be configured to provide communications between the computing device 202 and other devices, such as the I/O devices 216, routers, access points, and so forth. The network interfaces 214 may include devices configured to couple to one or more networks including local area networks (LANs), wireless LANs, wide area networks (WANs), wireless WANs, and so forth. For example, the network interfaces 214 may include devices compatible with Ethernet, Wi-Fi, Bluetooth, ZigBee, Z-Wave, 3G, 4G, LTE, and so forth.

The computing device 202 may include one or more busses or other internal communications hardware or software that allows for the transfer of data between the various modules and components of the computing device 202.

As shown in FIG. 2, the computing device 202 may include one or more memories 218. The memory 218 may include one or more computer-readable storage media (CRSM). The CRSM may be any one or more of an electronic storage medium, a magnetic storage medium, an optical storage medium, a quantum storage medium, a mechanical computer storage medium, and so forth. The memory 218 may provide storage of computer-readable instructions, data structures, program modules, and other data for the operation of the computing device 202. A few example modules are shown stored in the memory 218, although the same functionality may alternatively be implemented in hardware, firmware, or as a system on a chip (SoC).

The memory 218 may include one or more operating system (OS) modules 220. The OS module 220 may be configured to manage hardware resource devices such as the I/O interfaces 212, the network interfaces 214, the I/O devices 216, and to provide various services to applications or modules executing on the processors 206. The OS module 220 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 222 and one or more of the following modules may also be stored in the memory 218. The modules may be executed as foreground applications, background tasks, daemons, and so forth. The data store 222 may use a flat file, database, linked list, tree, executable code, script, or other data structure to store information. In some implementations, the data store 222 or a portion of the data store 222 may be distributed across one or more other devices including other computing devices 202, network attached storage devices, and so forth.

A communication module 224 may be configured to establish communications with one or more other computing devices 202, such as the host device 102, the client device 106, and so forth. The communications may be authenticated, encrypted, and so forth.

The memory 218 may store the service module 108 that is configured to utilize information in or associated with the message 104 to perform one or more actions on the host device 102. For example, the service module 108 may be configured to, responsive to the message 104, process data using the processor 206 and the memory 218 of the host device 102. The message 104 may be stored in the data store 222. As described above, the message 104 may include one or more data classification tags 114 and one or more values 116 associated with a particular data classification tag 114. The service module 108 or an associated logging service may store the log data 110 in the data store 222.

One or more of the modules such as the communication module 224, the service module 108, and so forth, may generate the context data 226. The context data 226 may include one or more of an application session identifier, source network address, a communication session identifier, message timestamp data 228, a process identifier, and so forth. The message timestamp data 228 may provide information indicative of time of origin, time of receipt, time of processing, a time of completion, and so forth, associated with a particular message 104 or group of messages 104.

The analysis module 118 may also be stored in the memory 218. As described above, the analysis module 118 performs one or more functions. A first function may include the selection of particular messages 104 for processing. A second function may include the determination of data classification tags 114 within the messages 104. A third function may include writing values 116 associated with a particular type of data classification tag 114 to the watch data 120. The watch data 120 may be stored in the data store 222. The fourth function may include generating search results 122 using the log data 110 and one or more of the watch data 120 or the monitor data 128. The monitor data 128 may be stored in the data store 222. The analysis module 118 may utilize the context data 226 in operation. For example, the analysis module 118 may use the message timestamp data 228 to determine if a particular message 104 corresponds to particular monitor data 128.

The memory 218 may also store the action module 124. The action module 124 may perform one or more actions based at least in part on the search results 122. For example, based on search results 122 indicating that sensitive data 112 is present in the log data 110, the action module 124 may generate alarm data 126. The alarm data 126 may be stored in the data store 222. In another example, based on search results 122 indicating that the log data 110 corresponding to information in monitor data 128 is not present within the log data 110, alarm data 126 may be generated indicative of a fault of the host device 102 or portion thereof.

In some implementations, one or more of the modules may be stored at least in part in the memory 218 of other computing devices 202, may be executed at least in part on the other computing devices 202, and so forth. For example, one host device 102 may be configured to execute the analysis module 118 and action module 124 that services a plurality of other host devices 102.

Other modules 230 may also be present in the memory 218. For example, encryption modules may be used to encrypt and decrypt communications between computing devices 202. Authentication modules may be used to authenticate communications sent or received by computing devices 202. Cryptographic modules may be used to perform encryption or decryption.

Other data 232 within the data store 222 may include information such as configurations and settings associated with computing devices 202 or modules thereof. For example, the other data 232 may include one or more threshold values. A threshold value may specify a minimum number of occurrences of a match between a particular value 116 of watch data 120 and the log data 110. Responsive to the number of match occurrences in the search results 122 meeting or exceeding the threshold value, the action module 124 may perform the one or more actions. Threshold values may include maximum values, minimum values, ranges of values, and so forth.

In different implementations, different computing devices 202 may have different capabilities or capacities. For example, host devices 102 may have significantly more processor 206 capability and memory 218 capacity compared to the processor 206 capability and memory 218 capacity of client devices 106.

Figure 3:
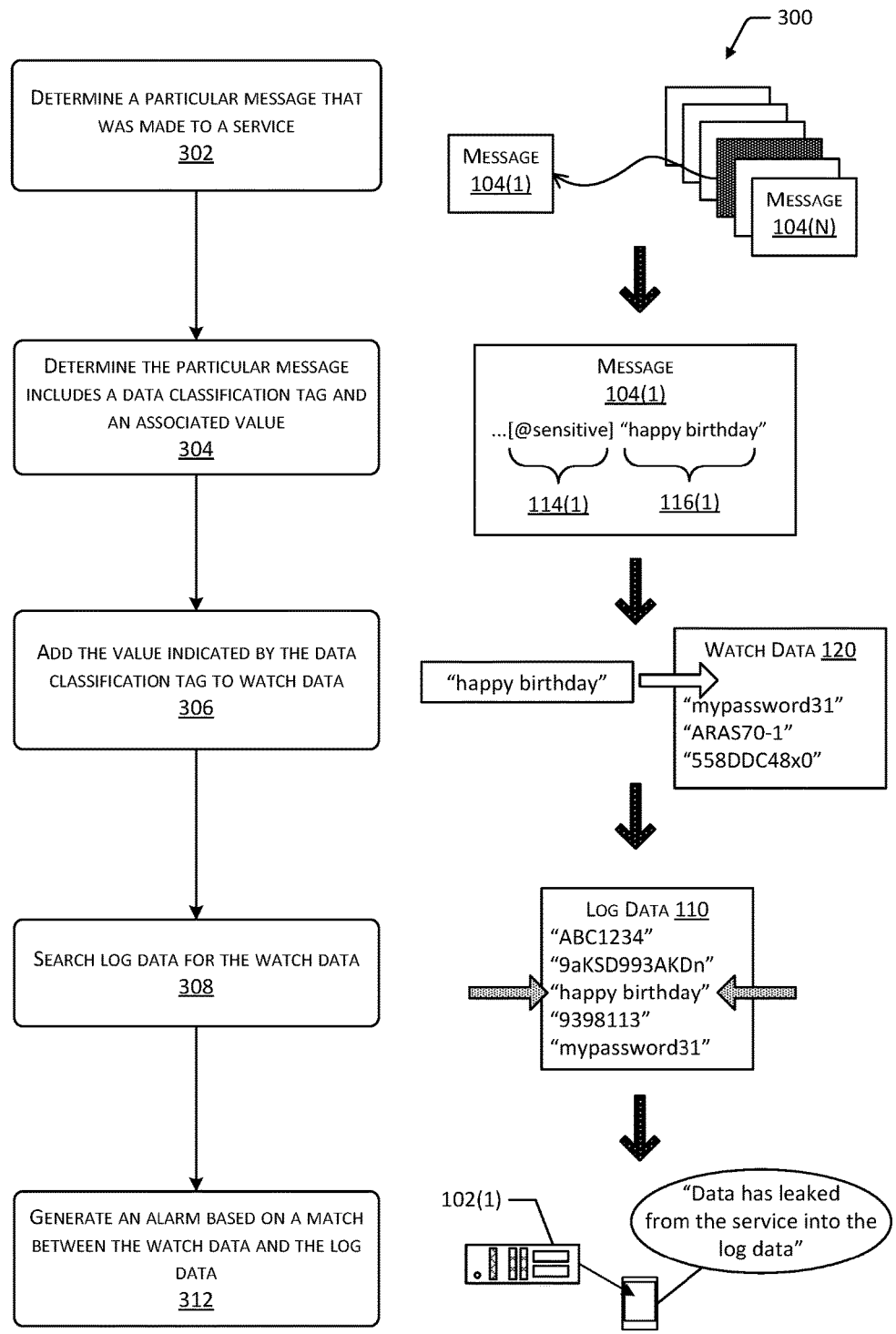
FIG. 3 depicts a block diagram of building watch data using data classification tags and searching log data for that watch data, according to one implementation.

FIG. 3 depicts a block diagram 300 of building watch data 120 using data classification tags 114 and searching log data 110 for that watch data 120, according to one implementation.

At 302, a particular message 104 that was sent to a service module 108 is determined. For example, the analysis module 118 may be configured to randomly or pseudo-randomly select a message 104 from a plurality of messages 104 for subsequent analysis.

At 304, the particular message 104 is determined includes a data classification tag 114 and an associated value 116. The analysis module 118 may be configured to add values 116 associated with particular data classification tags 114, such as those indicative of sensitive data 112. In the example depicted here, the message 104(1) includes the sensitive data 112 of "happy birthday".

At 306, the value 116 indicated by the data classification tag 114 is added to the watch data 120. For example, the value 116 of "happy birthday" may be inserted or otherwise incorporated into the data structure of the watch data 120.

At 308, the log data 110 is searched for one or more of the values 116 stored in watch data 120. For example, the analysis module 118 may perform the search and determine that the string "happy birthday" appears in the log data 110.

At 312, alarm data 126 is generated based at least in part on a match between at least a portion of the watch data 120 and the log data 110. As described above, the match may be an identical match or a non-identical match within which the two or more values correspond within a threshold value of one another. For example, the alarm data 126 may comprise a message indicating that data is leaking from the service into log data 110 that is provided to a system administrator by way of a tablet computer or smart phone.

Figure 4:
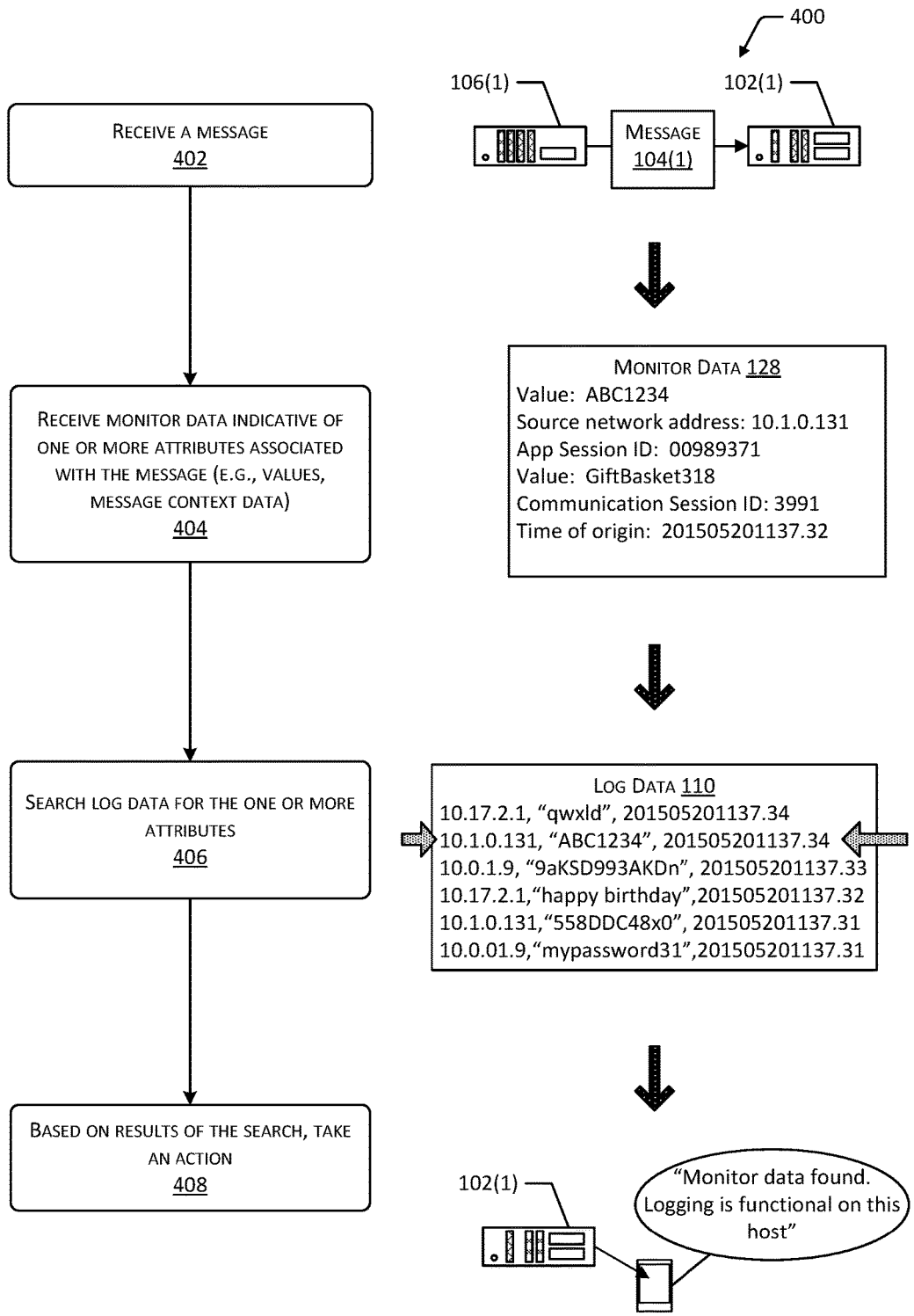
FIG. 4 depicts a block diagram of testing logging functionality using monitor data, according to one implementation.

FIG. 4 depicts a block diagram 400 of testing logging functionality of a host device 102 using monitor data 128, according to one implementation.

At 402, a message 104 is received. The message 104 may be specially formed for the purposes of testing or may be a message 104 created as part of the normal operation of a client device 106, such as in response to user input.

At 404, monitor data 128 is received that is indicative of one or more attributes associated with the message 104. For example, the monitor data 128 may include information such as the values 116, the context data 226, and so forth, corresponding to the message 104. For example, the monitor data 128 may include an application session ID of "00989371".

At 406, the log data 110 is searched for the one or more attributes. For example, the analysis module 118 may determine the log data 110 does include the app session ID of "00989371". In some implementations, the search of the log data 110 may be performed at some interval after the message 104 has been processed by the service module 108. For example, the service module 108 may be allocated five minutes to complete and log a message 104 and the search may thus be initiated after those five minutes. As described above, in some implementations, the search may be for identical matches or non-identical matches such as specified by threshold value. In the event that a match is not found to the monitor data 128, in some implementations, the search may be retried at other times.

At 408, based on the search results 122, one or more actions are taken. The action module 124 may generate alarm data 126 indicating that at least a portion of the monitor data 128 was found in the log data 110. Should the search fail to find a match within a threshold amount of time or threshold number of retries or combination thereof, the alarm data 126 may be indicative of a failure of at least a portion of the host device 102.

Figure 5:
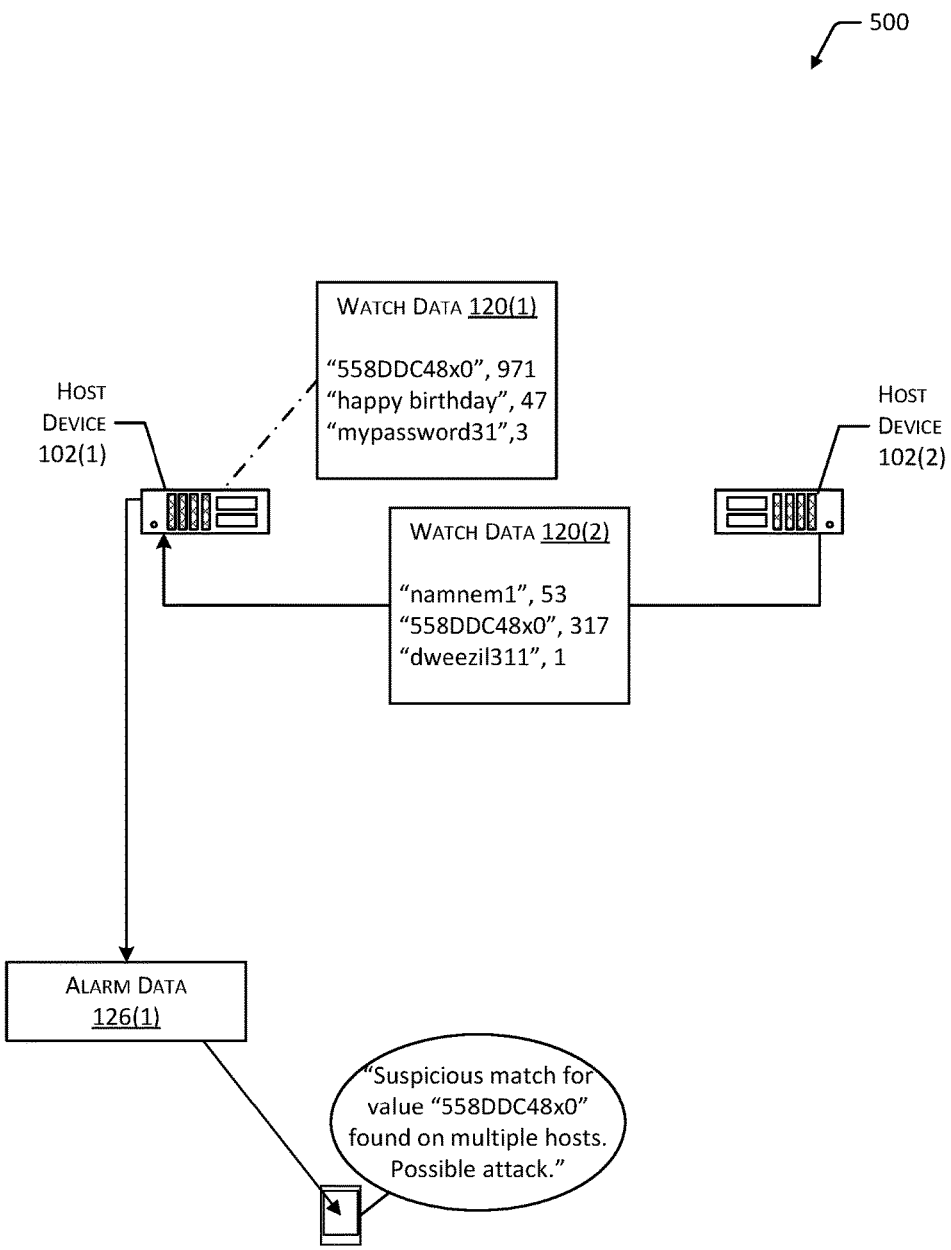
FIG. 5 depicts a block diagram of comparing watch data from one or more hosts to determine larger scale anomaly, according to one implementation.

FIG. 5 depicts a block diagram 500 of comparing watch data 120 from one or more host devices 102 to determine a larger scale anomaly, according to one implementation.

In some implementations, each host device 102 may implement one or more of the service module 108, the analysis module 118, the action module 124, and so forth. Many host devices 102 may operate contemporaneously to provide services. For example, in a large-scale deployment thousands of host devices 102 may provide services to a large number of client devices 106. As described above, various techniques may be used to determine the leakage sensitive data 112 into log data 110 as well as to audit the operation of the logging system.

By exchanging information between host devices 102, failures or threats that are of larger scope may be detected. For example, an attacker may attempt to use a malformed message 104 to elicit a particular behavior of the host device 102. The attacker may use a botnet or other distributed system to send their malformed message 104 to a plurality of the host devices 102. Similarly, a denial of service attack may involve sending the same or similar information to many host devices 102 contemporaneously.

As depicted here, the first host device 102(1) may receive information from a second host device 102(2). For example, the second host device 102(2) has generated and provided watch data 120(2). The first host device 102(1) may use the analysis module 118 to analyze the first watch data 120(1) produced locally with the second watch data 120(2) that was received from the second host device 102(2).

In some implementations, the watch data 120 exchanged may include information indicative of a number of occurrences that were detected by the local analysis module 118. Information about the number of occurrences both on a particular host device 102 and summed across a plurality of host devices 102 may be used by the action module 124 to determine one or more actions to take. For example, the second watch data 120(2) may indicate that the sensitive data 112 value 116 of "558DDC48×0" was detected 317 times in the second log data 110(2). Combined with the first watch data 120(1) that indicates that the sensitive data 112 value 116 of "558DDC48×0" was detected 971 times in the first log data 110(1), the total of 1,288 occurrences may exceed a threshold value of 1,000 occurrences. Based at least in part on exceeding the threshold value, the action module 124 of the first host device 102(1) may generate alarm data 126 indicative of a systemic alert.

To maintain the integrity of the sensitive data 112 or the values thereof that appear in the watch data 120, in some implementations the watch data 120 may be maintained in a secured environment, encrypted, hashed, and so forth. For example, the second watch data 120(2) may be encrypted or hashed prior to being provided to the first host device 102(1).

Illustrative Processes

Figure 6:
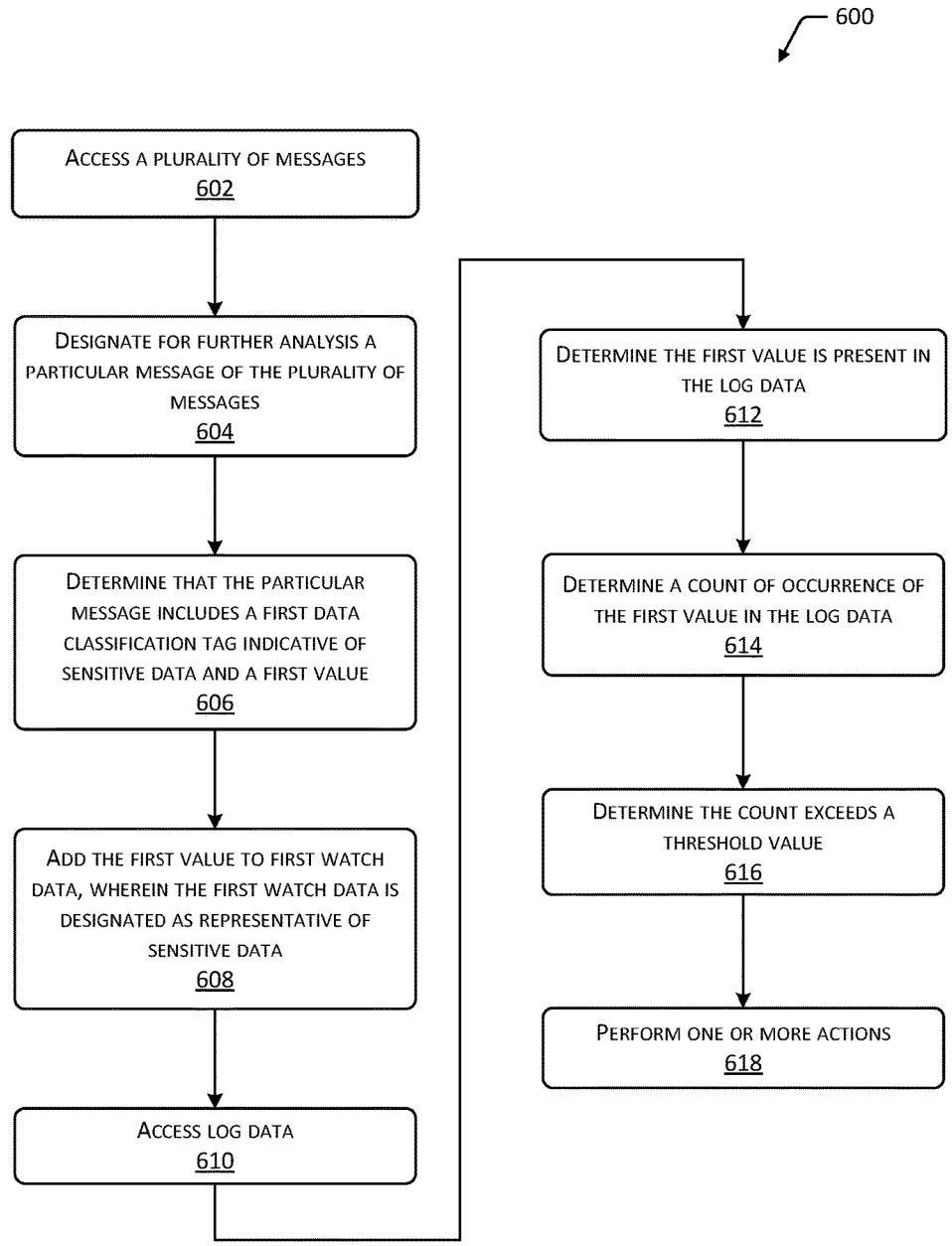
FIG. 6 is a flow diagram of a process for generating watch data and analyzing log data with the watch data, according to one implementation.

FIG. 6 is a flow diagram 600 of a process for generating watch data 120 and analyzing log data 110 with the watch data 120, according to one implementation. In some implementations, the process may be implemented at least in part by one or more of the OS module 220, the communication module 224, service module 108, the analysis module 118, the action module 124, or other modules 230.

At 602, a plurality of messages 104 is accessed. For example, the message 104 may be sent to an API of a service provided by execution of a service module 108.

At 604, a particular message 104 of the plurality of messages 104 is designated for further analysis. In some implementations, designation may be based on the output of a pseudorandom number generator, a random number generator, a sequence number associated with each of the plurality of messages 104, a user identifier associated with an origin of the message 104, a service identifier associated with the origin of the message 104, a network address indicative of the origin of the message 104, a timestamp of the message 104. For example, output from a pseudorandom number generator may be used to select a particular message 104 from the plurality of messages 104 for analysis. In another example, every thousandth message 104 may be selected for further analysis.

At 606, the particular message 104 that includes a first data classification tag 114(1) indicative of sensitive data 112 and a first value 116(1) of that sensitive data 112 is determined. In one implementation, the message 104 may be parsed to identify strings that are indicative of the data classification tags 114. For example, the message 104 may be searched for the string value of "@sensitive".

Likewise, other determinations may be made. For example, it may be determined that the particular message 104 includes a second data classification tag 114(2) indicative of public data and a second value 116(2) comprising public data.

At 608, the first value 116(1) is added to the first watch data 120. As described above, the watch data 120 is designated as representative of samples of sensitive data 112.

At 610 the log data 110 is accessed. For example, log data 110 may be retrieved from the data store 222.

At 612, the first value 116(1) is determined as being present in the log data 110. For example, the analysis module 118 may perform a search of the log data 110 using one or more of the values 116 stored in the watch data 120. The analysis module 118 may be configured to operate after a predetermined interval, trigger event, and so forth. For example, the analysis module 118 may perform the search after receiving trigger data that indicates new data has been written to the log data 110. In another example, the analysis module 118 may perform analysis at particular intervals, such as specified by a timer. A minimum interval and a maximum interval may be specified, with the analysis occurring between the two. The intervals may be specified by an automated process, developer, administrator, and so forth. In another example, the analysis module 118 may process the log data 110 after the log data 110 has been archived.

At 614, a count of occurrences of the first value 116(1) in the log data 110 is determined. For example, the count of occurrences may be indicative of the number of distinct appearances the first value 116(1) makes in the log data 110.

At 616, it is determined if the count of occurrences exceeds a threshold value. For example, the threshold value may be 10 and the number of occurrences of the sensitive data 112 with the value 116 of "happy birthday" may be 47.

At 618, one or more actions are performed. For example, responsive to the determination the count of occurrences exceeds the threshold value, the action module 124 may generate alarm data 126 indicative of leakage of the sensitive data 112 into the log data 110.

In another example, the action may involve curtailing access. For example, context data 226 of the particular message 104 may be determined. The context data 226 may be indicative of one or more of an application session identifier, source network address, a communication session identifier, timestamp, a process identifier, and so forth. Responsive to the first alarm data 126, the service module 108, the OS module 220, the communication module 224, or combination thereof may be configured to disregard messages 104 associated with at least a portion of the context data 226. Continuing the example, communication module 224 may drop all connections associated with the client device 106 originating the message 104. In another implementation, the action may comprise sending the alarm data 126 indicative of the leak to the client device 106 that originated the message 104. The client device 106 may then perform one or more actions responsive to the receipt of the alarm data 126. For example, client device 106 may deactivate one or more service modules 108 executing thereon.

The process of FIG. 6 may be used in conjunction with the other processes described herein. For example, the process of FIG. 4 may be used to audit logging as well.

Figure 7:
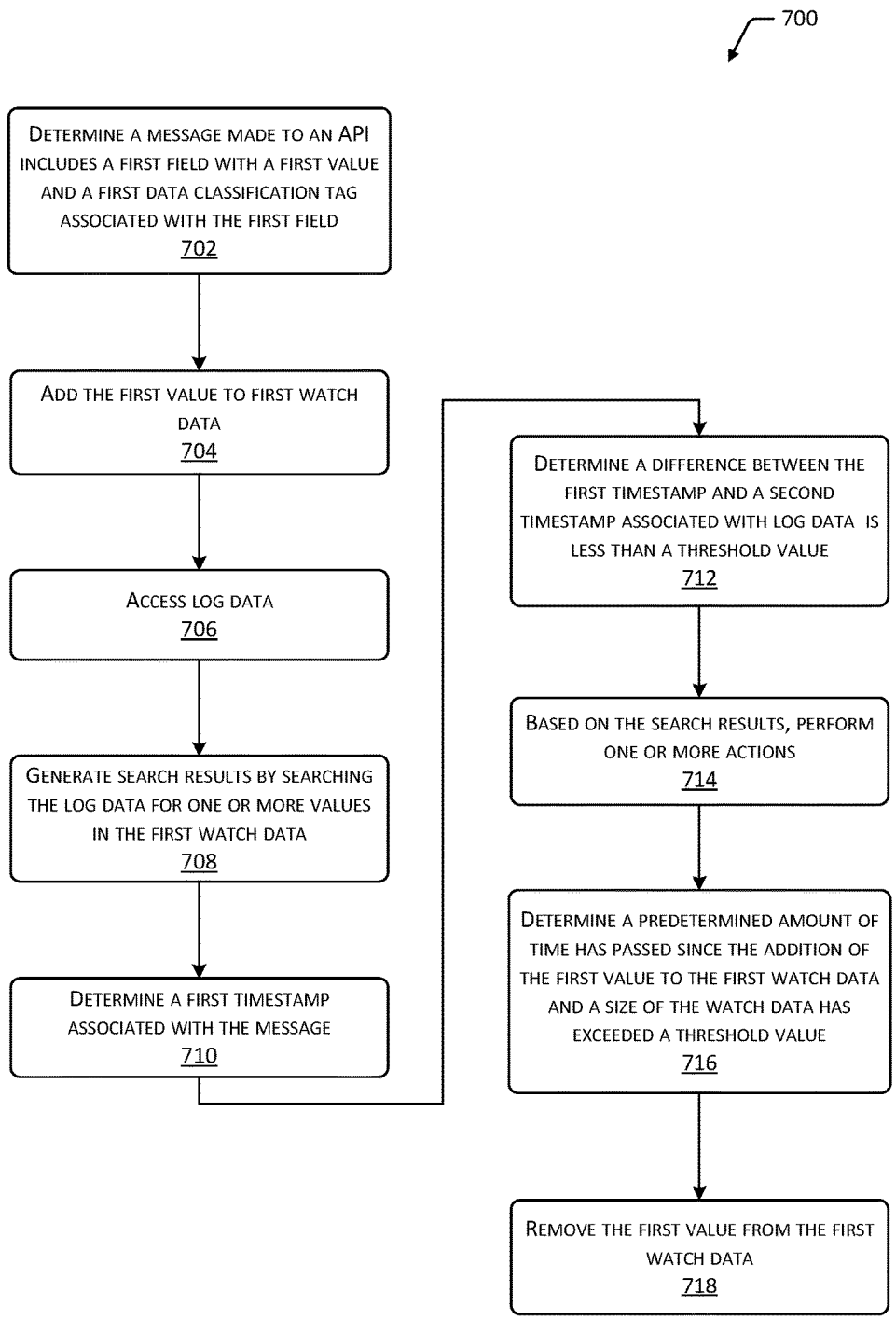
FIG. 7 is a flow diagram of another process for generating watch data and analyzing log data with the watch data, according to one implementation.

FIG. 7 is a flow diagram 700 of another process for generating watch data 120 and analyzing log data 110 with the watch data 120, according to one implementation. In some implementations, the process may be implemented at least in part by one or more of the OS module 220, the communication module 224, the service module 108, the analysis module 118, the action module 124, or other modules 230.

At 702, a message 104 sent to an API of a service module 108 executing on a first host device 102(1) is determined. In some implementations, the selection of the message 104 from a plurality of messages 104 may be based on one or more of: output from a pseudorandom number generator, a sequence number associated with each of the plurality of messages 104, a user identifier associated with an origin of the message 104, a service identifier associated with the origin of the message 104, a network address indicative of the origin of the message 104, a timestamp of the message 104, and so forth.

The message 104 may include a first value 116(1) and a first data classification tag 114 associated with the first value 116(1). The first data classification tag 114(1) may be indicative of sensitive data 112.

At 704, the first value 116(1) is added to first watch data 120(1). This addition may be based on the presence of the data classification tag 114 in the message 104 that is associated with the particular value 116. In some implementations, the first watch data 120(1) may comprise one or more predetermined values. For example, if the sensitive data 112 is limited to a particular set of values, a list of those values may be included in the watch data 120.

At 706 log data 110 is accessed. The log data 110 may be accessed responsive to a particular trigger. For example, a trigger may comprise passage of a predetermined interval of time, when the size of the log data 110 has reached a threshold limit, upon addition of a predetermined number of lines to the log data 110, and so forth.

At 708, search results 122 are generated by searching the log data 110 for one or more values 116 present in the first watch data 120(1). For example, the search results 122 may be indicative of a number of occurrences of the first value 116(1) in the log data 110. In some implementations, the search results 122 may include information indicative of a second timestamp associated with an entry in the log data 110 that has a second value 116(2) matching the first value 116(1).

At 710, a first timestamp associated with the message 104 is determined. For example, the first timestamp may comprise a time that the message 104 was received by the service module 108.

At 712, a difference between the first timestamp and the second timestamp occur is determined as being less than a threshold value. For example, the threshold value may specify a predetermined interval of time relative to one another.

At 714, based on the search results 122, one or more actions are performed. In one implementation, the one or more or more actions may include generating alarm data 126 based on the determination that the number of occurrences exceeds a threshold value. In another implementation, the one or more actions may comprise sending, to an originator of the message 104, alarm data 126 such as a notification indicative of appearance of the first value 116(1) in the log data 110.

In some implementations, the context data 226 for a message 104 associated with the search results 122 may be determined. As described above, the context data 226 may be indicative of one or more of an application session identifier, a communication session identifier, a process identifier, and so forth. Responsive to the first alarm data 126, the service module 108 may be configured to disregard later messages 104 having one or more attributes in common with the context data 226. For example, the client device 106 that is the originator of the message 104 may be prevented from establishing communication with the host device 102.

In yet another implementation, the one or more actions include receiving second watch data 120(2) generated by a second host device 102(2). As described above with regard to FIG. 4, the first host device 102(1) may determine one or more values 116 in the first watch data 120(1) correspond to the second watch data 120(2) and generate an alarm.

In some implementations, the performance of the one or more actions may be responsive to the determination that the first timestamp and the second timestamp occur at less than the predetermined interval of time relative to one another.

At 716, a predetermined amount of time is determined to have passed since the addition of the first value 116(1) to the first watch data 120(1). In some implementations, a size of the watch data 120 may be determined and compared to a threshold value. The size may be indicative of bits, bytes, count of entries, and so forth. The determination may include one or more of the predetermined amount of time and the size.

At 718, the first value 116(1) is removed from the first watch data 120(1). For example, the entries in the watch data 120 may expire or otherwise timeout. As described above with regard to 716, the removal may also be contingent on the determination that the size of the first watch data 120(1) has reached or exceeded a threshold value. For example, the removal may require both the predetermined amount of time having passed and the size of the watch data 120 exceeding the threshold value.

Figure 8:
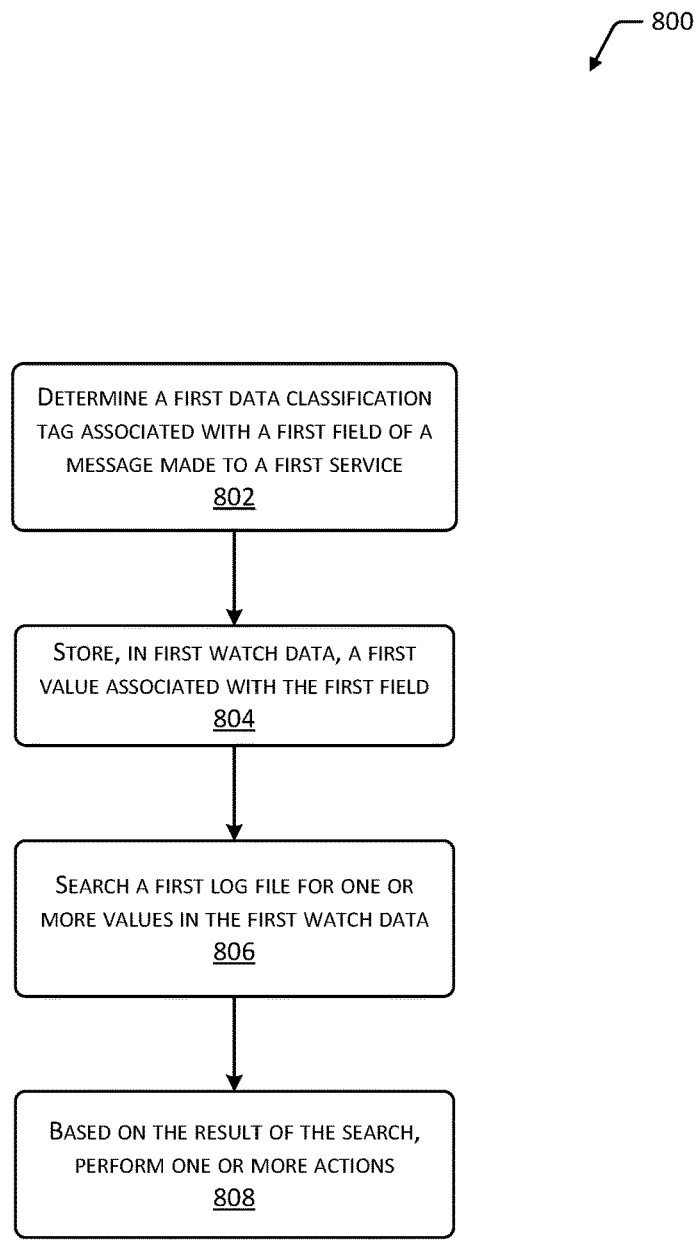
FIG. 8 is a flow diagram of another process for generating watch data using data classification tags and analyzing log data, according to one implementation.

FIG. 8 is a flow diagram 800 of another process for generating watch data 120 using data classification tags 114 and analyzing log data 110, according to one implementation. In some implementations, the process may be implemented at least in part by one or more of the OS module 220, the communication module 224, service module 108, the analysis module 118, the action module 124, or other modules 230.

At a first host device 102(1), at 802 a first data classification tag 114(1) associated with a first field storing a first value 116(1) of a message 104 sent to a first service module 108(1) is determined. For example, the data classification tag 114 may be indicative of sensitive data 112. As described above, the sensitive data 112 may include personally identifiable information, cryptographic data, a message from one user to another user, or other information deemed to be sensitive.

At 804, the first host device 102(1) stores the first value 116(1) in first watch data 120(1).

At 806, the first host device 102(1) searches a first log data 110(1) for one or more values 116(1) in the first watch data 120(1).

At 808, the first host device 102(1), based on results of the search, performs one or more actions. These actions may include, but are not limited to, one or more of: terminating an existing data connection with a client device 106 that originated the message 104, preventing the opening of additional data connections with the client device 106 that originated the message 104, removing one or more execution privileges from the first service module 108(1), limiting communication by the first service module 108(1) to a set of predefined services, terminating execution of the first service module 108(1), and so forth. For example, the execution privileges for the first service module 108(1) to access particular memory locations may be rescinded or restricted.

As described above with regard to FIG. 4, a second host device 102(2) may generate the message 104 to the first service module 108(1) executing on the first host device 102(1). The generated message 104 has one or more predetermined attributes. The second host device 102(2) may send the message 104 to the first service module 108(1) on the first host device 102(1). The second host device 102(2) may send monitor data 128 indicative of the predetermined attributes to the first host device 102(1).

Returning to the first host device 102(1), the first host device 102(1) may determine that at least a portion of the one or more predetermined attributes in the monitor data 128 are present in the first log data 110(1). Based on this determination, data indicative of normal operation of at least a portion of the first host device 102(1) may be generated. For example, the first host device 102(1) may send alarm data 126 that indicates the logging operation of the first host device 102(1) appears to be normal.

As described above with regard to FIG. 5, in some implementations, a plurality of host devices 102 may exchange information between one another or with the centralized server. Based on the information exchanged, systemic or larger scale issues may be identified.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claims is:

1. A system comprising:
   one or more memories storing computer-executable instructions; and
   one or more hardware processors configured to execute the computer-executable instructions to:
   access a plurality of messages;
   designate for further analysis a particular message of the plurality of messages;
   determine that the particular message includes a first data classification tag indicative of sensitive data and that refers to a first value comprising sensitive data by parsing the particular message to identify strings indicative of the first data classification tag and the first value;
   access log data;
   determine the parsed first value is present in the log data; and
   based on the first value being present in the log data, perform one or more actions to prevent inclusion of the sensitive data into the first log data.

2. The system of claim 1, further comprising computer-executable instructions to:
   determine that the particular message includes a second data classification tag indicative of public data and a second value comprising public data by parsing the particular message to identify strings indicative of the second data classification tag and the second value;
   determine the second value is not present in the log data; and
   responsive to the determination that the second value is not present in the log data, generate an alarm indicative of a logging malfunction.

3. The system of claim 1, further comprising computer-executable instructions to:
   determine a count of occurrences of the first value in the log data exceeds a threshold value; and
   responsive to the determination the count of occurrences of the first value in the log data exceeds the threshold value, increase a level of security associated with the service by:
   reducing a maximum number of read operations to memory permitted to the service,
   reducing a maximum number of write operations to memory permitted to the service,
   limiting communication by the service to a set of predefined services,
   restricting access to one or more of an input device or an output device,
   encrypting the log data, changing collection of the log data from a verbose logging that includes the sensitive data to a terse logging that only includes a session identifier and a timestamp, or disabling collection of the log data.

4. The system of claim 1, further comprising computer-executable instructions to:

determine the sensitive data is included in the log data; and based on the determination that the sensitive data is included in the log data, prevent writing of the additional sensitive data to the log data.

5. The system of claim 1, further comprising computer-executable instructions to:

determine that a predetermined amount of time has passed since the addition of the value to the watch data; and based on this determination that a predetermined amount of time has passed since the addition of the value of the watch data, remove the value from the watch data.

6. A method comprising:

determining a message sent to a first service executing on a first device, wherein the message includes a first value and a first data classification tag indicative of sensitive data and that refers to the first value;

adding the first value to first watch data based on presence of the first data classification tag in the message;

accessing log data;

generating search results that are indicative of the first value in the log data by searching the log data for one or more values indicative of the first value in the first watch data;

determining the search results indicate that the one or more values in the first watch data are in the log data; and based on the determination that the one or more values in the first watch data are in the log data, performing one or more actions to prevent inclusion of the sensitive data into the first log data.

7. The method of claim 6, further comprising:

identifying a number of occurrences of the first value in the log data;

determining a threshold value for the number of occurrences of the first value in the log data;

determining that the number of occurrences of the first value in the log data exceeds the threshold value; and based on the determination that the number of occurrences of the first value in the log data exceeds the threshold value, performing the one or more actions to prevent leakage of the sensitive data into the log data.

8. The method of claim 6, the one or more actions comprising disabling collection of the log data.

9. The method of claim 6, the one or more actions includes one or more of generating an alarm, deactivating the first service, or increasing security controls associated with execution of the first service to restrict storing of the sensitive data to a secure environment.

10. The method of claim 6 further comprising:

accessing monitor data indicative of the message sent to the first service, the monitor data including the first value, the first data classification tag indicative of sensitive data and that refers to the first value, and information indicative of context data for the message.

11. The method of claim 6, wherein the context data is indicative of one or more of an application session identifier, source network address, a communication session identifier, a timestamp, or a process identifier.

12. The method of claim 6, further comprising:

determining a first timestamp associated with the message;

determining a second timestamp associated with an entry in the log data that has a second value matching the first value;

determining a difference between the first timestamp and the second timestamp is less than the threshold value; and responsive to the determination that the difference between the first timestamp and the second timestamp is less than the threshold value, performing the one or more actions.

13. The method of claim 12, further comprising:

determining a predetermined amount of time has passed between the first timestamp and the second timestamp;

based on the determination that the predetermined amount of time has passed between the first timestamp and the second timestamp, removing the first value from the first watch data.

14. The method of claim 6 further comprising:

determining a size of the watch data;

comparing the size of the watch data to a threshold value to determine whether the size of the watch data exceeds the threshold value; and based on the determination that the size of the watch data exceeds the threshold value, performing the one or more actions.

15. The method of claim 6, wherein the one or more actions include one or more of:

terminating an existing data connection with a second service that sent the message, preventing the opening of additional data connections with the second service, removing one or more execution privileges from the first service executing on the first device, limiting communication by the first service module to a set of predefined services, or terminating execution of the first service.

16. The method of claim 6 further comprising:

accessing monitor data indicative of the message, the monitor data including information indicative of context data for the message;

from the context data, obtaining a network source address, a timestamp, and a process identifier associated with the message; and identifying the message based on the network source address, the timestamp, and the process identifier associated with the message.

17. The method of claim 6, further comprising:

accessing monitor data indicative of the message;

determine context data from the monitor data; and from the context data, determine that the context data includes one or more of:

an application session identifier;

a source network address;

a communication session identifier; or a process identifier;

disregarding messages associated with particular values of the one or more of the application session identifier, the source network address, the communication session identifier, or the process identifier.

18. A system comprising:

a first host comprising:

a first memory storing first computer-executable instructions; and a first hardware processor configured to execute the first computer-executable instructions to:
  determine a first data classification tag indicative of sensitive data and that refers to a first value in a message sent to a first service;
  store the first value;
  search first log data for one or more values indicative of the first value to generate search results; and
  responsive to the search results indicating that the one or more values are in the first log data, perform one or more actions to prevent inclusion of the sensitive data into the first log data.

19. The system of claim 18, further comprising:
a second host comprising:
  a second memory storing second computer-executable instructions; and
  a second hardware processor configured to execute the second computer-executable instructions to:
  generate the message to the first service;
  send the message to the first service on the first host;
  send, to the first host, monitor data including context data associated with the message, the context data indicative of one or more of an application session identifier, source network address, a communication session identifier, a timestamp, or a process identifier; and
  the first hardware processor configured to execute the first computer-executable instructions to:
  access the monitor data including the context data associated with the message; from the context data, obtaining a source network address, the timestamp, and the process identifier associated with the message; and
  identify the message based on the network source address, the timestamp, and the process identifier associated with the message.

20. The system of claim 18, the first hardware processor configured to execute the first computer-executable instructions to:
  determine a first timestamp associated with the message;
  determine a second timestamp associated with an entry in the log data that has a second value matching the first value;
  determine a difference between the first timestamp and the second timestamp is less than a threshold value; and
  responsive to the determination that the difference between the first timestamp and the second timestamp is less than the threshold value, perform the one or more actions.

* * * * *